United States Patent
Posey, Jr.

(10) Patent No.: US 8,116,315 B2
(45) Date of Patent: *Feb. 14, 2012

(54) SYSTEM AND METHOD FOR PACKET CLASSIFICATION

(75) Inventor: Nolan J. Posey, Jr., Allen, TX (US)

(73) Assignee: YT Networks Capital, LLC, Wilmington, DE (US)

( * ) Notice: Subject to any disclaimer, the term of this patent is extended or adjusted under 35 U.S.C. 154(b) by 615 days.

This patent is subject to a terminal disclaimer.

(21) Appl. No.: 11/471,149

(22) Filed: Jun. 20, 2006

(65) Prior Publication Data

US 2006/0239288 A1  Oct. 26, 2006

Related U.S. Application Data

(63) Continuation of application No. 10/138,760, filed on May 3, 2002, now Pat. No. 7,184,444, which is a continuation-in-part of application No. 09/698,666, filed on Oct. 27, 2000, now Pat. No. 6,665,495.

(51) Int. Cl.
 *H04L 12/28* (2006.01)
 *H04L 12/56* (2006.01)
 *H04L 1/00* (2006.01)
 *H04L 12/26* (2006.01)
 *H04L 12/54* (2006.01)
 *G06F 15/173* (2006.01)
 *G06F 15/16* (2006.01)

(52) U.S. Cl. ............. 370/395.31; 370/395.43; 370/392; 370/395.1; 370/252; 370/398; 370/422; 370/428; 709/224; 709/249

(58) Field of Classification Search ............ 370/395.31, 370/395.43, 392, 395, 252, 389, 393, 395.1, 370/398, 395.6, 422, 428; 709/224, 249
See application file for complete search history.

(56) References Cited

U.S. PATENT DOCUMENTS 5,253,248 A  10/1993  Dravida et al.
(Continued)

FOREIGN PATENT DOCUMENTS

EP  0849916 A2  6/1998
(Continued)

OTHER PUBLICATIONS

Borgonovo et al. Unslotted deflection routing in all-optical networks; Global Telecommunications Conference, 1993, including a Communication Theory Mini-Conference. Technical Program Conference Record, IEEE in Houston. GLOBECOM '93., IEEE, Nov. 29-Dec. 2, 1993.

(Continued)

*Primary Examiner* — Ronald Abelson
(74) *Attorney, Agent, or Firm* — Connolly Bove Lodge & Hutz LLP

(57) ABSTRACT

The present invention provides method for data packet processing in a telecommunications system. The method of the present invention can include the steps of (i) determining a set of classification parameters for a data packet at an ingress edge unit, wherein the classification parameters include a packet destination, (ii) communicating the data packet to an egress edge unit and (iii) routing the data packet to a destination egress port at the egress edge unit according the classification parameters determined at the ingress edge unit. In one embodiment of the present invention, the classification parameters can include a destination egress edge unit, a destination egress port at the destination egress edge unit, and quality of service parameter for proper processing of the data packet.

21 Claims, 8 Drawing Sheets

U.S. PATENT DOCUMENTS

| | | | |
|---|---|---|---|
| 5,303,078 A | 4/1994 | Brackett et al. | |
| 5,327,552 A | 7/1994 | Liew | |
| 5,351,146 A | 9/1994 | Chan et al. | |
| 5,416,769 A | 5/1995 | Karol | |
| 5,469,284 A | 11/1995 | Haas | |
| 5,477,530 A | 12/1995 | Ahmadi et al. | |
| 5,486,943 A | 1/1996 | Sasayama et al. | |
| 5,546,391 A * | 8/1996 | Hochschild et al. | 370/413 |
| 5,617,413 A | 4/1997 | Monacos | |
| 5,734,486 A | 3/1998 | Guillemot et al. | |
| 5,737,106 A | 4/1998 | Sansonetti et al. | |
| 5,757,526 A | 5/1998 | Shiragaki et al. | |
| 5,848,055 A | 12/1998 | Fedyk et al. | |
| 5,978,359 A | 11/1999 | Caldara et al. | |
| 6,005,698 A | 12/1999 | Huber et al. | |
| 6,023,456 A | 2/2000 | Chapman | |
| 6,052,726 A | 4/2000 | Fontenot | |
| 6,320,858 B1 * | 11/2001 | King et al. | 370/390 |
| 6,345,040 B1 | 2/2002 | Stephens et al. | |
| 6,501,869 B1 | 12/2002 | Athale | |
| 6,567,408 B1 | 5/2003 | Lee | |
| 6,674,754 B1 | 1/2004 | Ofek | |
| 6,721,315 B1 | 4/2004 | Xiong et al. | |
| 6,763,192 B1 | 7/2004 | Jagannathan | |
| 6,782,201 B2 | 8/2004 | Yamamoto et al. | |
| 6,819,870 B1 | 11/2004 | Ge et al. | |
| 6,834,310 B2 | 12/2004 | Munger et al. | |
| 6,859,579 B2 | 2/2005 | Shiozawa et al. | |
| 6,907,001 B1 * | 6/2005 | Nakayama et al. | 370/230 |
| 6,928,244 B1 | 8/2005 | Goldstein et al. | |
| 6,975,638 B1 * | 12/2005 | Chen et al. | 370/412 |
| 7,068,871 B2 | 6/2006 | Sugama et al. | |
| 2001/0043562 A1 * | 11/2001 | Hrastar et al. | 370/227 |
| 2002/0015551 A1 | 2/2002 | Tsuyama et al. | |
| 2002/0048066 A1 | 4/2002 | Antoniades et al. | |
| 2002/0080446 A1 | 6/2002 | Derventzis et al. | |
| 2002/0101869 A1 | 8/2002 | Garcia-Luna-Aceves | |
| 2003/0030866 A1 | 2/2003 | Yoo | |
| 2003/0063348 A1 | 4/2003 | Posey | |
| 2003/0067653 A1 | 4/2003 | Aicklen | |
| 2004/0151171 A1 | 8/2004 | Lee et al. | |
| 2009/0067434 A1 * | 3/2009 | Brueckheimer et al. | 370/395.1 |

FOREIGN PATENT DOCUMENTS

| | | |
|---|---|---|
| WO | WO 95/30318 A2 | 11/1995 |
| WO | WO 00/42811 A1 | 7/2000 |

OTHER PUBLICATIONS

Chevalier et al. "A new packet routing strategy for ultra-fast photonic networks", Dept. of Electron & Electr. Eng., Strathclyde Univ., Glasgow; This paper appears in: Global Telecommunications Conference, 1998, GLOBECOM '93., "*The Bridge to Global Integratio*", 1998.

Bannister et al., "A performance model of deflection routing in multibuffer networks with non-uniform traffic Networking," IEEE/ACM Transactions on vol. 3, issue 5, pp. 509-520, Oct. 1995.

Hunter, David K., "Buffering in optical packet switches", *Jrnl. Of Lightwave Technology*, vol. 16:12, pp. 2081-2094, Dec. 1998.

Borgonovo et al. "On the design of optical deflection-routing networks", *INFOCOM '94. Networking for Global Communications. 13th Proceedings IEEE*, Publication Date: Jun. 12-16, 1994, pp. 120-129, vol. 1, Meeting Date: Jun. 12, 1194-Jun. 16, 1994.

Li et al., "Deflection Routing in Slotted Self-Routing Networks with Arbitrary Topology," *IEEE Jrnl. On Selected Areas in Communications*, vol. 22:9, pp. 1812-1822, Nov. 2004.

International Search Report for PCT/US01/51237, Mar. 20, 2003.

Kanna, et al., "*A High Bandwidth Space-Time-Wavelength Multiplexed Optical Switching Network*", Proceedings of the IEEE INFOCOM '97, Los Alamitos, CA, Apr. 7-12, 1997.

McKeown, et al., "*Tiny Tera: A Packet Switch Core*", IEEE Micro, IEEE Inc., New York, vol. 17, No. 1, pp. 26-33, Jan. 1997.

Soeren Lykke Danielsen, et al., "*WDM Packet Switch Architectures and Analysis of the Influence of Tuneable Wavelength Converters on the Performance*", Jun. 1998.

Soeren L. Danielsen, et al., IEEE Photonics Technology Letters, vol. 10, No. 6, "*Optical Packet Switched Network Layer Without Optical Buffers*", unknown.

John M. Senior, et al., SPIE—The International Society of Optical Engineering, *All-Optical Networking: Architecture, Control and Management Issues* vol. 3531, pp. 455-464, Nov. 3-5, 1998.

M.C. Chia, et al., Part of SPIE Conference on All-Optical Networking: Architecture, Control and Management Issues, "*Performance of Feedback and Feedforward Arrayed—Waveguide Gratings-Based Optical Packet Switches with WDM Inputs/Outputs*", Nov. 1998.

G. Depovere, et. al., Philips Research Laboratories, "*A Flexible Cross-Connect Network Using Multiple Object Carriers*" all pages, unknown.

John M. Senior, et al., SPIE—The International Society for Optical Engineering, "*All-Optical Networking 1999: Architecture, Control, and Management Issues*" vol. 3843, pp. 111-119, Sep. 19-21, 1999.

Jonathan S. Turner, Journal of High Speed Networks 8 (1999) 3-16 IOS Press, "*Terabit Burst Switching*", pp. 3-16, 1999.

Ken-ichi Sato, IEEE Journal on Selected Areas in Communications, vol. 12, No. 1, Jan. 1994 "*Network Performance and Integrity Enhancement with Optical Path Layer Technologies*", pp. 159-170, Jan. 1994.

F. Callegati, et al., Optical Fiber Technology 4, 1996 "*Architecture and Performance of a Broadcast and Select Photonic Switch*", pp. 266-284, 1998.

* cited by examiner

SYSTEM AND METHOD FOR PACKET CLASSIFICATION

RELATED APPLICATIONS

This application is a continuation of and claims priority under 35 U.S.C. 120 from U.S. patent application Ser. No. 10,138,760, filed May 3, 2002, entitled "SYSTEM AND METHOD FOR PACKET CLASSIFICATION," now U.S. Pat. No. 7,184,444, which is a continuation-in-part of U.S. patent application Ser. No. 09/698,666, filed Oct. 27, 2000, entitled "Non-Blocking, Scalable Optical Router Architecture and Method for Routing Optical Traffic," now U.S. Pat. No. 6,665,495, both of which are hereby fully incorporated by reference.

TECHNICAL FIELD OF THE INVENTION

The present invention relates generally to telecommunication systems and methods, and more particularly, a system and method for classification of data packets to facilitate the routing of the data packets.

BACKGROUND OF THE INVENTION

In telecommunications networks, routers and switches are used to direct data packets from a data packet's origin to its destination. Often a router or switch will have multiple incoming and outgoing transmission lines (or "ports"). Therefore, to route a packet through a telecommunications network, it is necessary to properly internally route the data packet at each router or switch from the incoming transmission port to the proper outgoing transmission port. This is commonly achieved by classifying the packets at the ingress edge of the switch/router. This classification of data packets can include determining the egress edge unit of the switch/router to which a particular data package should be routed. In this manner, data packets can be switched from a particular incoming transmission port to a particular outgoing transmission port through the switch/router.

In current data packet classification and routing systems, a data packet arrives at an ingress interface unit of a router where packet classification occurs. During packet classification, current systems will classify the data packet based on its destination port, which is associated with a particular egress edge unit. According to the classification, the router will route the data packet to the appropriate egress edge unit of the optical network for further routing. In current optical networks, however, the classification of a data packet is typically not retained once the data packet leaves the ingress edge unit in route to the egress edge unit.

In operation, data packets are classified in current systems and methods for classifying data packets based on the destination egress edge unit. When a packet arrives at the destination egress edge unit, classification is repeated to determine the destination egress interface port of the egress edge unit. Thus, the processing to determine the destination occurs in two stages. First it occurs at the ingress edge unit to determine to which egress edge unit a data package is bound and, again, at the egress edge unit to determine to which egress interface port the data package should be routed. Because classification occurs both at the ingress edge unit and the egress edge unit, current optical networks require that there be classification hardware at both units.

As noted, prior art packet classification systems and methods require repeating the classification process at the egress edge interface unit. Therefore, a need exists for a packet classification system and a method that can perform the classification only at the ingress edge unit, thus reducing the complexity and computational requirements at the egress edge unit.

SUMMARY OF THE INVENTION

The present invention provides a data packet classification system and method that substantially eliminates or reduces disadvantages and problems associated with previously developed data packet classification systems and methods used in telecommunications networks.

More specifically the present invention provides method for data packet classification in a telecommunications system. The method of the present invention can include the steps of (i) determining a set of classification parameters for a data packet at an ingress edge unit, wherein the classification parameters include a packet destination, (ii) communicating the data packet to an egress edge unit and (iii) routing the data packet to a destination egress port at the egress edge unit according the classification parameters determined at the ingress edge unit. In one embodiment of the present invention, the classification parameters can include a destination egress edge unit, a destination egress port at the destination egress edge unit, and quality of service parameter for proper processing of the data packet.

The present invention provides substantial technical advantage over previously developed systems and methods for routing data packets because the present invention can route data packets to an egress port without reclassifying the data packet at the egress edge unit associated with the port, thus minimizing duplicative hardware and processing requirements at the egress edge unit.

The present invention provides another substantial advantage over previous systems and methods for routing data packets by eliminating the delay caused by reclassifying a data packet at an egress edge unit, thereby increasing the throughput of optical routers/switches utilizing the present invention.

The present invention provides yet another technical advantage by allowing the routing of multiple data packets to a single destination edge unit.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the figures like numerals being used to refer to like and corresponding parts of the various drawings.

The invention provides a data packet classification system and method wherein a data packet can be classified at the ingress edge unit of a router/switch. The data packet can be routed to its destination egress interface port based on the classification parameters that were determined at the ingress edge unit of the router/switch. Because classification does not have to be repeated at the egress edge unit, duplicative processing and hardware requirements are substantially reduced.

Figure 1:
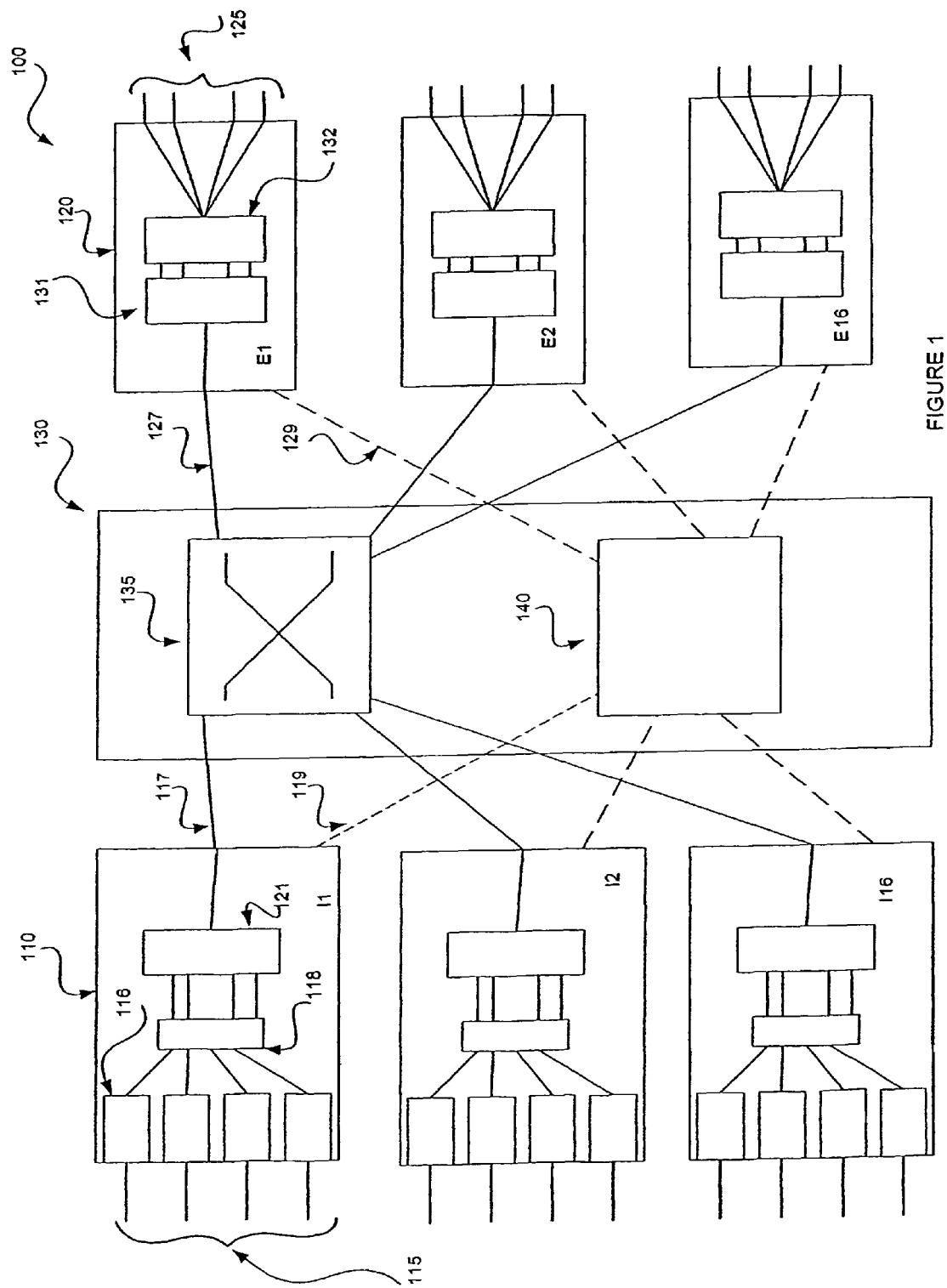
FIG. 1 is a diagrammatic representation of one embodiment of a router 100 that can perform data packet classification at the ingress edge unit according to the present invention.

FIG. 1 is a diagrammatic representation of one embodiment of a router 100 that can perform data packet classification at the ingress edge unit according to the present invention. Router 100 can include a number of ingress edge units 110 (shown in FIG. I as sixteen ingress edge units labeled I1,I2,I3 . . . I16), a number of egress edge units: (shown in FIG. 1 as sixteen egress edge units labeled E1, E2, E3 . . . E16) and an optical switch core 130 that comprises a switch fabric 135 and a controller 140. While each of the edge units is illustrated separately for the sake of simplicity, it should be understood that edge units comprising both an ingress edge unit and an egress edge unit in the same physical structure can be constructed. Each of the edge units 110 can communicate data to switch fabric 135 via ingress packet links 117 and each egress edge unit can receive data from switch fabric 135 via egress packet links 127. In one embodiment of the present invention the ingress packet links 117 and egress packet links 127 can be DWDM links. Additionally, each ingress edge unit and each egress edge unit can receive and communicate control information with controller 140 via ingress control links 119 and egress control links 129, respectively.

Each ingress edge unit 110 and each egress edge unit 120 of router 100 can include a variety of ingress interface ports 115 and egress interface ports 125, respectively, which can externally connect to an assortment of other network elements such as switches, routers, cross-connects and/or transmission equipment. The ingress interface ports 115 and egress interface ports 125 can support, for example, high bandwidth IP traffic and/or TDM traffic. In one embodiment of the present invention, each of these ports can support 10 Gbps and above.

In operation, data packets can arrive at an ingress edge unit 110 through the ingress interface ports 115. At each ingress interface port 115, an ingress port card 116 associated with an ingress interface port 115 can determine a set of classification parameters for an incoming data packet. In one embodiment, the classification parameters can include a destination egress edge unit and a destination egress interface port. Additionally, the classification parameters might include a quality of service ("QoS") parameter, including the type of service bits, source IP address, layer four and five classification, service level agreements, operator configuration and the QoS software in use. The classification parameters can be forwarded from each ingress port card 116 to controller 140 via ingress control links 119. Additionally, the classification parameters can be placed in a classification index for the data packet. The classification index can be included in the overhead of the data packet sent to the egress edge unit.

Controller 140 can collect data from each ingress edge unit 110, egress edge unit 120 and switch fabric 135 on a periodic basis (e.g., every millisecond), create a schedule that effects each ingress edge unit 110 and egress edge unit 120 for the next cycle, and provide the schedule to each ingress edge unit 110 and each egress edge unit 120. During scheduling, controller 140 can use quality of service parameters to determine which of the arriving data packets should be sent at any given time or whether a data packet should be dropped (e.g., in a congestion situation). Algorithms such as random early detection, weighted random early detection, early packet discard and other algorithms could be used to determine which packets should be dropped. Based on this schedule, ingress port card 116 can place an incoming data packet in a QoS queue (for subsequent forwarding to TWDM converter 118) or forward the data directly to TWDM converter 118. Ingress port card 116 can maintain multiple QoS queues for each egress interface port 125.

At TWDM converter 118 data packets from each ingress interface port card 116 can be forwarded to wave slot ($\mu\lambda$) buffers. There can be multiple $\mu\lambda$ buffers for each ingress interface port 115, and the number of $\mu\lambda$ buffers for each ingress interface port 115 can correspond to the number of egress interface ports 125 (e.g., if there are K egress interface ports there can be K $\mu\lambda$ buffers for each ingress interface port). Data packets arriving at each ingress interface port 115 can be directed to the $\mu\lambda$ buffer associated with the destination egress interface port 125 to which the data packet is bound. Thus, in one embodiment of the present invention, each $\mu\lambda$ can contain data packets from the same ingress interface port 115 that are bound to the same egress interface port 125.

When the loading of the $\mu\lambda$ buffers is complete for a cycle, the TWDM converter 118 can subdivide the available $\mu\lambda$s into as many channels as there are wavelengths utilized by the ingress packet links 117. It should be noted that each $\mu\lambda$ can include zero data packets, a single data packet, or multiple data packets bound for the same egress interface port 125. DWDM transmitter 121 can then forward a $\mu\lambda$ to optical switch fabric 135 for further routing to the destination egress edge unit. Each $\mu\lambda$ can be forwarded across multiple data streams, one stream per lambda as supported by the DWDM lambda count.

As $\mu\lambda$s pass through optical switch fabric 135, controller 140 can control the configuration of switch fabric 135 so that each $\mu\lambda$ is routed to the appropriate egress edge unit 120. Because controller 140 can dynamically reconfigure switch fabric 135 based on the schedule that it established, conflicts and contentions of $\mu\lambda$s in switch fabric 135 can be avoided. At each egress edge unit 120, a DWDM receiver 131 can receive various $\mu\lambda$s from switch fabric 135 that have been directed from each ingress edge unit 110 to the receiving egress edge unit 120. The DWDM receiver 131 can demultiplex each $\mu\lambda$ and generate a separate optical stream for each wavelength that was present in the DWDM lambda count. Egress TWDM converter 132 can buffer each $\mu\lambda$ received and route the $\mu\lambda$s to the destination egress port cards 126 according to the schedule received from controller 140. The egress output port cards 126 could then forward the data to external components in the optical network. Additionally, if a classification index was included in the overhead of the data packet, egress edge unit 120 can read the classification index to determine routing information, quality of service processing, etc. However, it should be noted that reading the classification index can be done with simplistic table reading hardware/software, and does not require that the data packet actually be reclassified at egress edge unit 120. The classification parameters are used to implement QoS handling in the egress ports 126.

As can be understood from the foregoing discussion, ingress edge unit 110 can determine a set of classification parameters, which can include a destination egress edge unit, a destination egress port, and QoS parameters for each incoming data packet. These classification parameters can be used by controller 140 to schedule the transmission of data packets to the destination egress edge unit, and, additionally, the transmission of data packets within the destination egress edge unit to the destination egress interface port. Because the routing of a data packet to the egress edge port can be controlled externally to the egress edge unit based on classification parameter determined at the ingress edge unit, data packets do not have to be reclassified at the egress edge unit. Therefore, duplicative classification hardware and software can be eliminated.

The discussion accompanying FIG. 1 described an exemplary embodiment of router 100. However, it should be understood that the present invention can be utilized to classify data packets at an ingress edge unit, without reclassification at the egress edge unit, in many configurations of optical routers or switches in an optical network.

Figure 2:
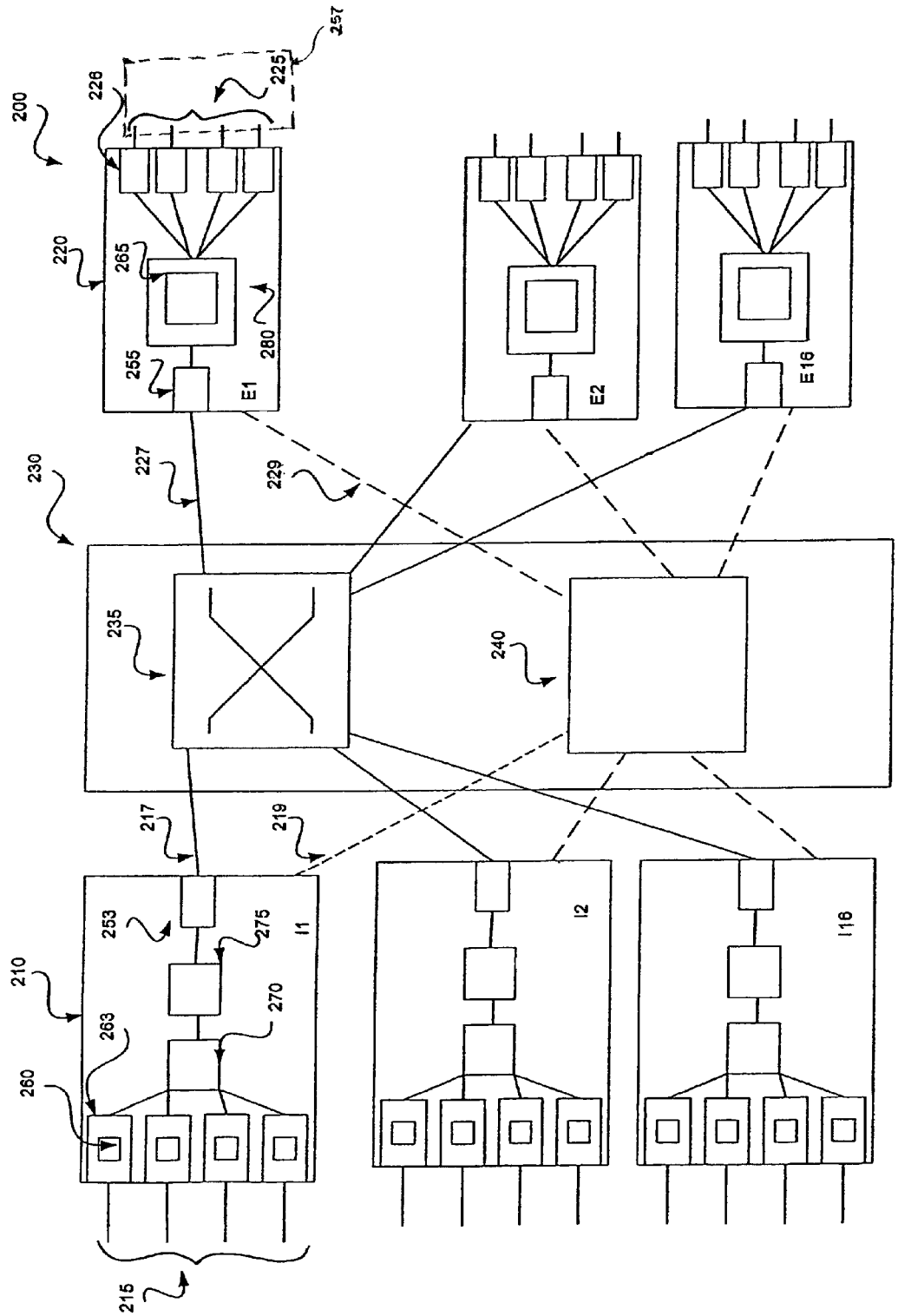
FIG. 2 is a diagrammatic representation of a second embodiment of a router that can perform data packet classification according to the present invention.

FIG. 2 is a diagrammatic representation of a second embodiment of a router 200 that can perform data packet classification at the ingress edge unit according to the present invention. Router 200 can include one or more ingress edge units 210, one or more egress edge units 220 and a optical switch core 230 for routing data packets between an ingress edge unit 210 and an egress edge unit 220 that can comprise an optical switch fabric 235 and a controller 240. While, for the sake of simplicity, the ingress and egress edge units are shown separately in FIG. 2, it should be understood the combined edge units can be constructed with an ingress edge unit and an egress edge unit in a single physical edge unit. Each ingress edge unit 210 and each egress edge unit 220 can contain many ingress and egress ports of different types, respectively, that can connect to a range of other optical network elements, such as switches, routers, cross-connects, and/or transmission equipment. Additionally, optical switch core 230 can comprise a single switch core or alternatively, can comprise a stack of switch cores or a multiple plane switch core.

For the sake of explanation, Router 200 could have 16 ingress edge units (labeled I1, I2, I3 . . . I16) and 16 egress edge units (labeled E1, E2, E3 . . . E16). Each edge unit could have 16 OC-192 ports that use packet over SONET to connect to other network elements. Each ingress edge unit 210 and each egress edge unit 220 can be connected to optical switch core 230 using WDM links with 16λ (16 ports) running at 10 Gbps for an aggregate of 265 Gbps. Each ingress edge unit can connect to switch fabric 235 via Ingress packet links 217 while Egress edge units can connect to switch fabric 235 via egress packet links 227. Additionally, ingress and egress edge units can exchange control information with controller 240 via ingress control links 219 and egress control links 229, respectively. The router illustrated in FIG. 2 is exemplary only and other router configurations, combinations of ingress and egress edge units, data rates and ports are possible. For a more detailed explanation of one embodiment of router 200 that can be used in conjunction with the present invention, see U.S. patent application Ser. No. 09/698,666, entitled "A Nonblocking Scalable Optical Router Architecture and Method for Routing Optical Traffic," incorporated by reference in its entirety.

In one embodiment of the present invention, router 200 can receive data packets from an ingress interface port 215. The data packets can be routed through ingress edge unit 210 to optical switch core 230 via an ingress edge unit output port 253. Egress edge unit 220 can receive data packets from the optical switch core 230 by egress edge unit input port 255, and transmit the data packets to the optical network through egress interface ports 225, which can be associated with an interface output card 257. In one embodiment, the ingress edge unit output port 253 can be an output WDM port and the egress edge unit input port 255 can be an input WDM port. Each ingress edge unit 210 can include a classification index module 260 for classifying data packets and each egress edge unit 220 can include a classification index processing module 265 for processing a packet classification index provided by classification index module 260. In one embodiment, the classification index module 260 can be contained in an ingress port card 263, however, it should be understood that the classification index module 260 functionality can be contained in any number of other units of router 200, such as at a super packet processor 270.

In operation, the data packets can be received at ingress edge unit 210 where classification index module 260 can determine the classification parameters for the data packet by reading the destination of the data packet from each packet's data packet header. If the packet's destination is given in the form of an IP address or other forwarding information, classification index module 260 can access a destination look-up table contained on a database that is accessible by classification index module 260 to correlate the data packet destination IP address to a destination egress edge interface unit 220 and a destination egress edge unit port 225 at that destination egress edge unit 220. Thus, classification index module 260 can determine for each data packet arriving at ingress edge unit 210 both the destination egress edge unit out of many egress edge units and a destination port within the destination egress edge unit out of many potential ports in the destination egress edge unit. In one embodiment of the present invention, the destination information, such as the egress edge unit and the egress interface port, can be placed in a classification index, which can be included in the overhead of the data packet. Alternatively, if super packets are being constructed by router 200, data packets that have been classified by classification index module 260 can be forwarded to super packet processor 270 and super packet factory 275 for aggregation into super packets and the classification parameters for individual data packets can be included in the overhead for the super packet. The construction of super packets will be discussed in conjunction with FIGS. 3 and 4.

The data packet (or super packet) with the classification index can then be sent to the appropriate egress edge unit 220 via optical switch core 230. At egress edge unit 220, classification index processing module 265 can read the egress edge unit destination port from the classification index and forward the data packet to the appropriate egress edge unit destination port; e.g., one of egress interface ports 225. Additionally, if super packets were constructed, egress edge unit super packet factory 275 can disassemble the super packets so that constituent data packets can be routed to the appropriate destination egress interface port according to the classification index. Because the destination port of an isolated data packet or a data packet in a super packet can be represented in a classification index, classification index processing module 265 can consist of simplistic table processing hardware or software.

In addition to reading the destination egress edge unit and the destination egress unit port for an incoming packet, classification index module 260 can determine quality of service parameters for the incoming data packet, including the type of service bits, the source IP address, layer four and five classification, service level agreements, operator configuration and the QoS software in use. It should be understood that these quality of service parameters are exemplary only and any quality of service parameters could be part of a data packet classification; e.g., TDM traffic, etc. Additionally, classification index module 260 can read other parameters from the packet header, including HDLC/PDT, IPV4, IPV6, NTLS, unicast or multicast. Classification index module 260 can then create a quality of service parameter vector which can be a compression of the quality of service parameters into code points that require less space so that the transported data from the ingress edge unit 210 to the destination egress edge unit 220 includes only the address information and the quality of service parameters vector, thus saving bandwidth. The quality of service parameters from a data packet can be used by controller 240 to determine which data packet should be sent at any given time. Additionally, the quality of service parameters could be used to determine if a data packet should be dropped based on the number of data packets. Algorithms such as random early detection, weighted random early detection, early packet discard and other well known algorithms could be used to determine which packets should be dropped.

Along with QoS parameters, the classification index can include information about queue management. For each quality of service supported by a router 200, each ingress edge unit and egress edge unit could have a queue to buffer data for transport with a particular quality of service. Thus, if router 200 supported J qualities of service, ingress edge unit 210 and egress edge unit 220 could have J quality of service queues. The ingress edge unit queue and/or the egress edge unit queue can be included in the classification index. In this manner, data packets can be direct to the appropriate queue for transport with a particular quality of service.

When the classification index and data packet arrive at egress unit 220, classification index processing module 265 can read the classification index for the data packet and forward the data packet to the appropriate egress interface port 225. In one embodiment of the present invention, at the destination egress interface card 226, a second table reader can also read the classification index to determine the quality of service for a data packet and to determine how the packet gets processed.

Because the present invention allows data packets to be routed from an ingress edge unit to port at an egress edge unit without reclassification of the data packet, the egress edge unit duplication of processing steps is reduced. Additionally, as the classification index can be read at the egress edge unit by simple table reading hardware or software, the hardware requirements for the egress edge unit are similarly reduced.

Figure 3:
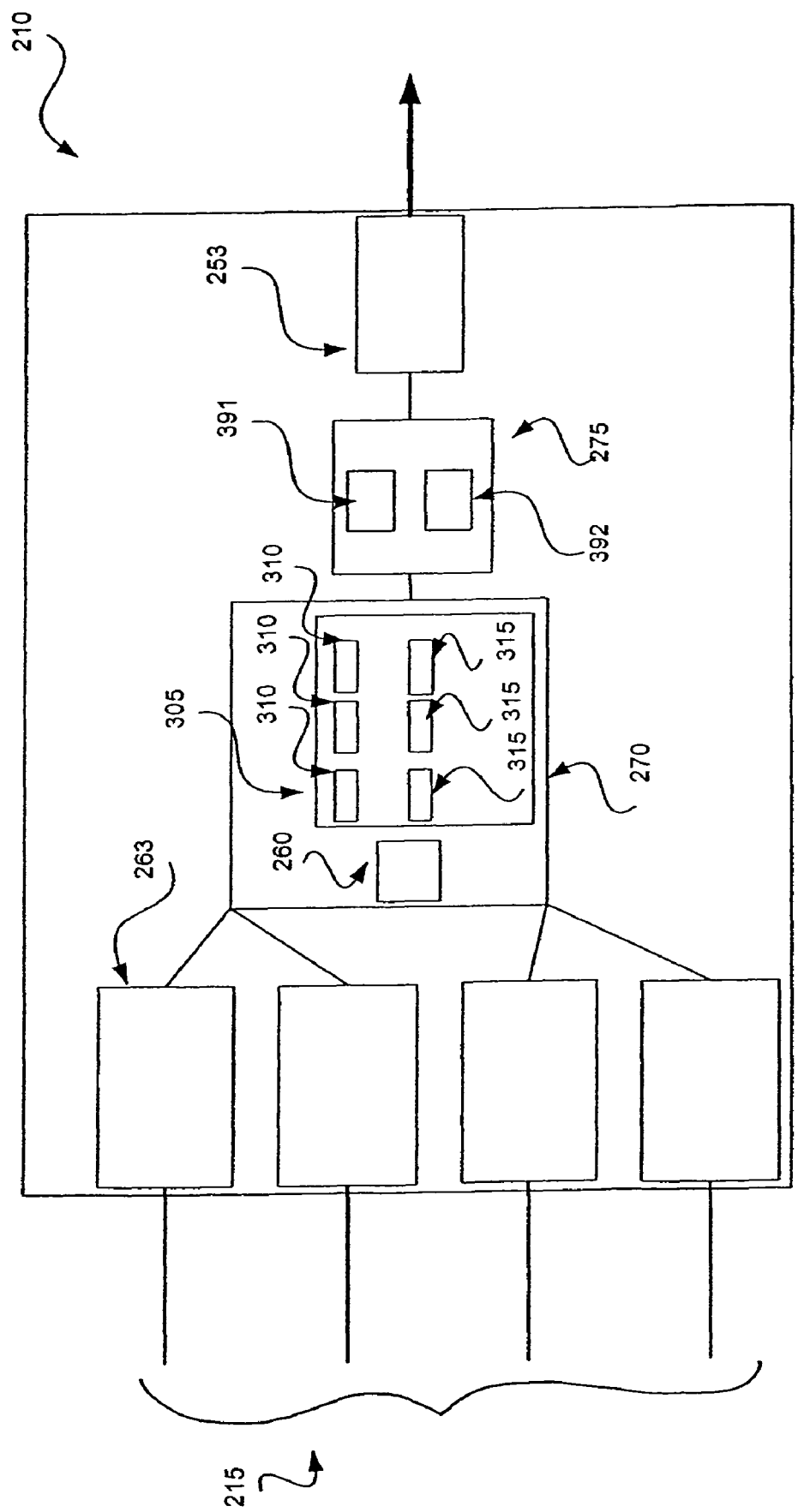
FIG. 3 is a diagrammatic representation of one embodiment of an ingress edge unit that can perform packet classification according to the present invention.

In addition to routing individual packets from an ingress edge unit 210 to an egress interface port 225 at an egress edge unit 220 without reclassification of the packet at the egress edge unit 220, the present invention can route super packets between an ingress edge unit 210 and ports 225 of the egress edge unit 220 without reclassification of the individual data packets at the egress edge unit 220. FIG. 3 is a diagrammatic representation of one embodiment of an ingress edge unit 210 capable of constructing super packets. In operation, an individual data packet arrives at the ingress edge unit 210 via an ingress interface port 215 destined for an egress interface port 225 of an egress edge unit 220. Classification index module 260, in one embodiment of the present invention can be located at a super packet processor 270. Super packet processor 270 can determine the length of a packet and phase align the incoming packet to convert the incoming data from a serial format to a parallel format. Classification index module 260 can determine, from the packet headers of the optical data packets, the egress edge unit 220 to which an incoming data packet is bound, the egress port 225 at the destination egress edge unit to which the data packet is bound, and other routing information (e.g., quality of service parameters and whether the incoming data packet contains TDM data). Super packet processor 270 can then route TDM data to TDM queues 310 within the packet classification queues 305 while routing PKT data to PKT queues 315 within the classification queues 305. The packet classification queue 305 can be memory device containing individual queues (or buffers) for storing various portions of the incoming data packets. The number of TDM queues and PKT queues can be determined by the number of egress edge units available.

With reference to FIG. 1, there are sixteen egress edge units available so there should be sixteen TDM queues and sixteen PKT queues in each set of queues, with each TDM queue and each PKT queue within a set of queues being assigned to a different egress edge unit. Thus, the TDM queue 310 assigned to the first egress edge unit 220 can collect the TDM data from incoming packets intended for the first egress edge unit 220, while the PKT queue 315 assigned to the first egress edge unit 220 can collect PKT data from incoming packets intended for the first egress edge unit.

Because all of the TDM data intended for any particular egress edge unit 220 gets collected in one particular TDM queue 310 and all of the PKT data intended for a particular egress edge unit gets collected in a single PKT queue 315, each packet classification queue 305 begins the process of building super packets by building a "partial" super packet, or "port bundle", containing all of the data arriving at one specific network port. 215 that is destined for a particular egress edge unit 265. Information that is common to all the data packets in a port bundle can be extracted by super packet processor 270 and be placed into the overhead of the port bundle along with classification information relevant to individual data packets. Super packet processor 270 can then forward the port bundles to super packet factory 275 where a super packet sub factory can assemble port bundles destined for each egress edge unit into super packets. Because super packets can be assembled for each egress edge unit, each super packet factory 275 can contain one super packet sub factory for each egress edge unit. For example, super packet sub factory 391 could correspond to the first egress edge unit, while super packet sub factory 392 could correspond to the second egress edge unit, and so on. In addition to assembling super packets, a super packet sub factory can derive information that is pertinent to a super packet as a whole and include that information in a super packet's classification index along with classification information regarding port bundles and classification information regarding the individual data packets in the super packet.

Figure 4:
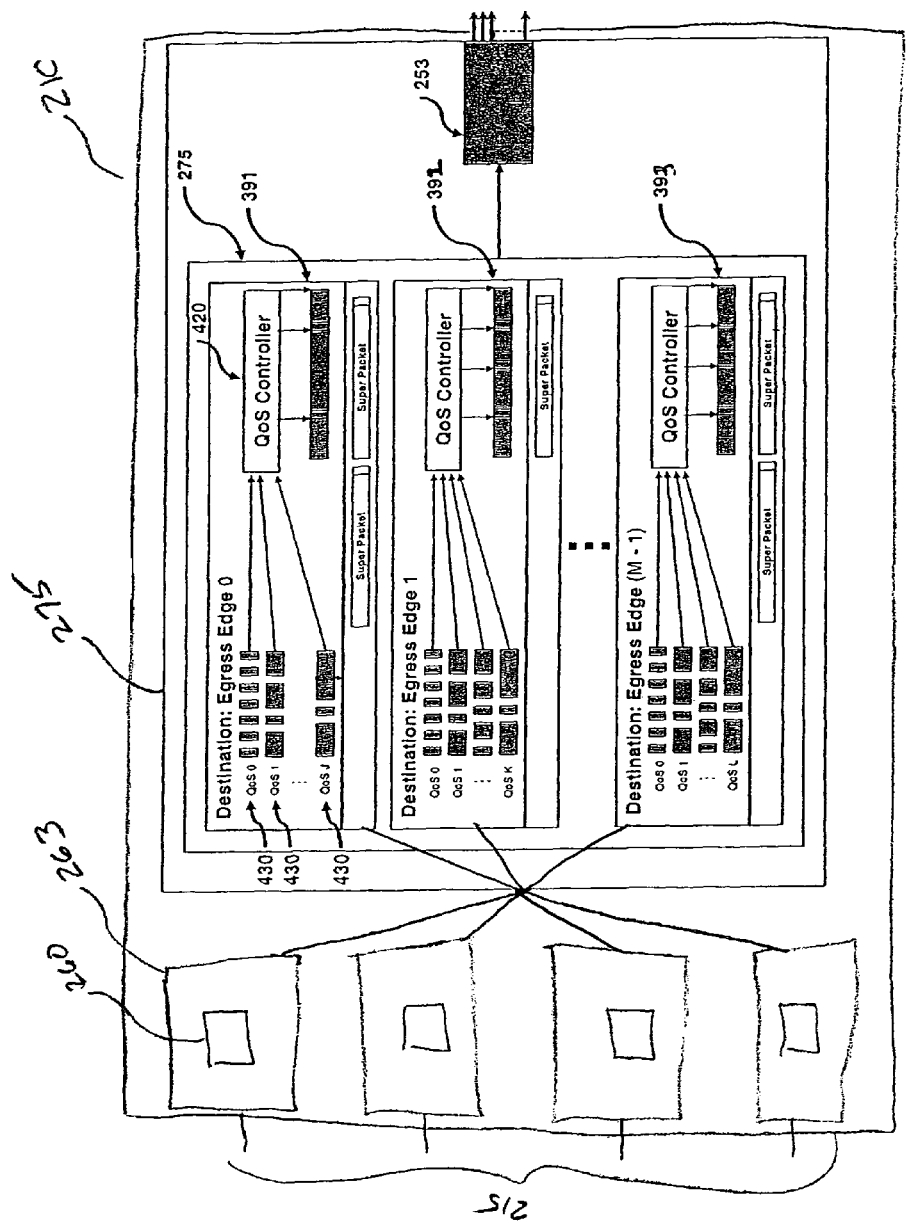
FIG. 4 is a diagrammatic representation of a second embodiment of an ingress edge unit that can perform packet classification according to the present invention.

FIG. 4, is a diagrammatic representation of an alternative embodiment of an ingress edge router that is capable of constructing super packets. As shown in FIG. 4, the QoS controller module 420 can build a classification index for each super packet that includes the classification parameters for each data packet. The classification index can be built so that each data packet has a classification entry in the classification index (e.g. a "per packet entry"). The classification index can be placed in the overhead of each super packet. The super packets, each with a classification index, can then be sent to an optical switch core 230 (not shown) to be routed to the appropriate destination egress edge unit 220. Thus, both the egress destination port processing and packet classification processing can occur at the packet classification module 260, and can be performed simultaneously. This essentially pushes the destination port determination function upstream from the egress edge to the ingress edge.

As shown in the embodiment of FIG. 4, the classification index module 260, which in this embodiment can be located at the input interface card 263, can forward the data to an ingress super packet factory 275 that will aggregate data intended for the same destination egress edge unit 220 into super packets. Each ingress super packet factory 275 can comprise a number of sub-factories(e.g., one sub-factory for each egress edge unit 265), where each sub-factory builds super packets destined for one of M destination egress edge units 220 (which can be individually designated E1, E2 . . . EM-1). Each egress edge unit 220 also has L destination output ports 225 (which can be individually designated P1, P2 . . . PL-1). Additionally, each egress edge unit 220 can have a different number of QoS parameters with a QoS parameter queue 430 for each QoS parameter. Thus, as shown in FIG. 4, ingress super packet factory 275 has different sub-factories 391, 392 and 393, where sub-factory 391 correlates to egress edge unit number one (e.g., E1) and has J number of QoS parameters and J QoS parameter queues, while sub-factory 392 corresponds to egress edge unit E2 and has K QoS parameters and sub-factory 393 corresponds to egress edge unit EM-1 and has L QoS parameters.

Ingress super packet factory 275 uses QoS controller 402 to build super packets for each of the M-1 egress edge units 220 by collecting all of the various data (having different QoS parameters) intended for the same destination egress edge unit 220. The QoS controller 420 builds the super packets from each of the various QoS parameter queues 430 in a particular sub-factory. After the super packets have been built, a port scheduler can forward the super packets from each of the ingress super packet factories 275, segment the super packets to place the data from the super packets onto all of the wavelengths over which it will be transported (e.g., in an ordered array) and transport the super packet across the multiple lambdas to an optical switch core (not shown).

It should be understood that the embodiments described in conjunction with FIGS. 3 and 4 are by way of example only, and a super packet could be constructed in many ways. However, for the purposes of the present invention, regardless of how a super packet is constructed each super packet can contain a classification index that classifies the data packets within the super packet so that the constituent data packets do not need to be reclassified at the destination egress edge unit.

Figure 5A:
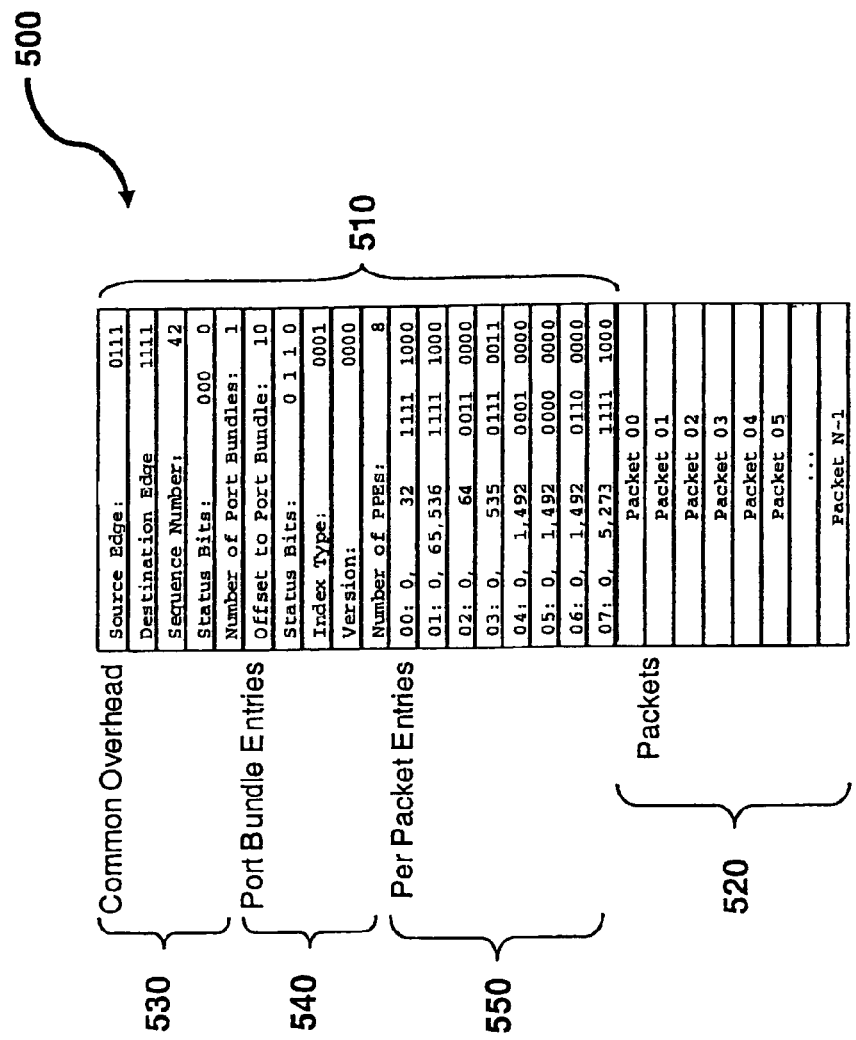
FIG. 5A illustrates one embodiment of super packet containing a classification index according to the present invention.

FIG. 5A illustrates one embodiment of a super packet 500 containing a classification index 510 according to the present invention. Super packet 500 can contain aggregated data packets 520 and a packet classification index 510 that can include a common overhead 530, a port bundle entry 540 and per packet entries 550. The common overhead 530 can contain classification parameters that are common to all the port bundles in super packet 500, port bundle entry 540 can include classification parameters that are common to each of the data packets in a port bundle and the per packet entries 550 can contain classification information for the individual data packets in super packet 530. While only one port bundle is shown in FIG. 5A (e.g., there is only one port bundle entry 540) it should be understood that super packet 500 could contain several port bundles or no port bundles.

Figure 5B:
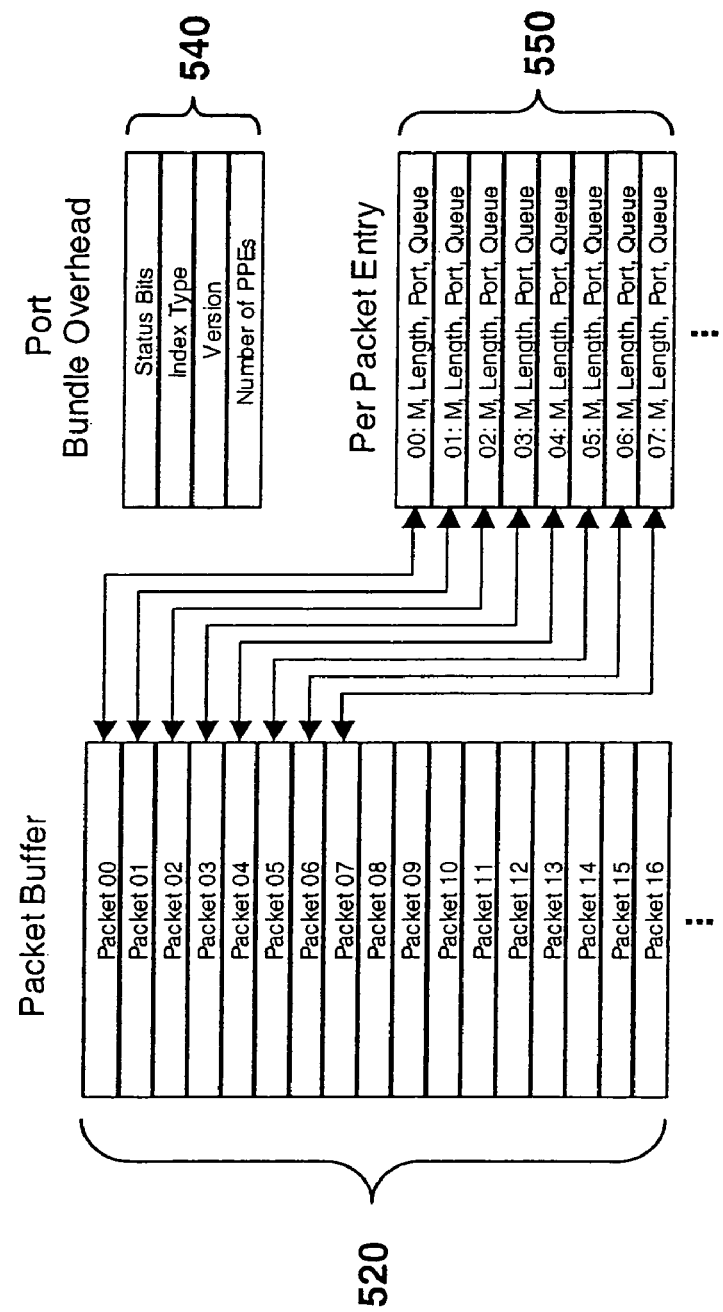
FIG. 5B illustrates one embodiment of a port bundle construction containing a classification index according to the present invention.

FIG. 5B illustrates one embodiment of a port bundle construction according to the present invention. Classification index module 260 can derive per packet classification information based on data extracted from the individual packet headers for the data packets. Thus, for example, per packet entry "00" corresponds to the classification information for packet "00", per packet entry "01" corresponds to the classification information for packet "01", and so on. At super packet processor 270, data packets arriving at the same ingress interface port 215 that are destined for the same egress edge unit 220 can be aggregated together into port bundles. Super packet processor 270 can then extract information based on commonalties between all of the packets, including the formatting of the per packet information (e.g., the index type), the version of software or hardware used to process the data packets, the status bits, and the number of per packet entries. Thus, a particular port bundle can include packets that are destined for the same egress edge unit 220, per packet information 550 for each data packet, and port bundle information 540 which is common to all the data packets in the port bundle.

Figure 5C:
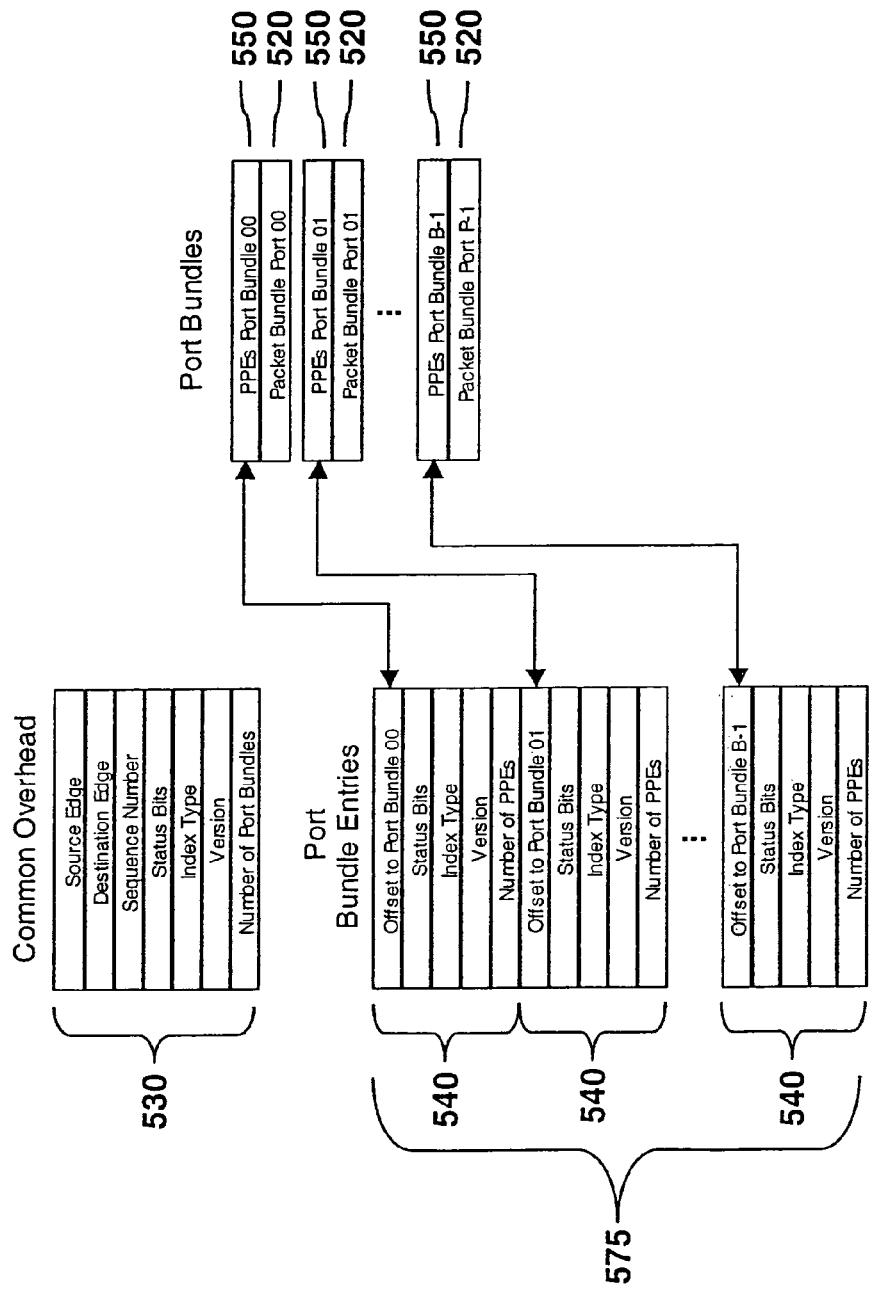
FIG. 5C illustrates one embodiment of a super packet construction containing a classification index according to the present invention.

FIG. 5C illustrates one embodiment of a super packet construction according to the present invention. As illustrated in FIG. 5C, various port bundles 575 can be aggregated together. Thus, for example, port bundle "00" through port bundle N-1 can be bundled together into a super packet at a super packet sub factory. The port bundles can include the per packet entries 550 for each port bundle and the group of data packets 520 associated with each port bundle. The classification index for the super packet can include port bundle entries 540 for each port bundle. Additionally, the super packet sub factory can extract classification parameters common to all of the port bundles in the super packet, including the source edge, destination edge, sequence number, status bits, index type, versions, and the number of port bundles. After the super packet is constructed, the super packet can be split across the various lambdas link layer processing and transportation to optical switch core 230. While the construction of super packet 500 has been described with reference to the aggregation of port bundles, it should be noted that, in one embodiment of the present invention, data packets can be directly aggregated into a super packet without first being placed in port bundles or can be aggregated into other types of bundles depending on the configuration of router 200. Regardless of the type of bundling employed—if any bundling is employed at all—the classification index can include a bundle entry (e.g., port bundle entry 540) to aid in the disassembly of the super packet.

As discussed, the classification index 510 for super packet 500 can include a classification index common overhead 530, a bundle entry 540 and per packet entries 550 for each of the data packets in a port bundle. Table 1 summarizes the information that can be contained in the packet classification index common overhead 530 for one embodiment of the present invention. Table 1 includes the field name, the number of bits and comments relating to the field. It should be noted that the parameters provided in Table 1 are exemplary only.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

TABLE 1

Example Classification Index Overhead

| Field Name | Number of Bits | Comments |
| --- | --- | --- |
| Source Edge | 4 | 16 Edges, 0000 ⇔ 1111 |
| Destination Edge | 4 | 16 Edges, 0000 ⇔ 1111 |
| Sequence Number | 16 | 0 ⇔ 65,535 |
| Status Bits | 4 | Reserved/Empty |
| Number of Port Bundles | 4 | 0 ⇔ 15 |

As can be seen from Table 1, one embodiment of the packet classification index common overhead 530 can include a source edge designation to identify the ingress edge unit 210 that is sending the super packet 500 and a destination edge designation to identify the destination egress edge unit 220. In the case of a router with 16 ingress edge units and 16 egress edge units, this data can be represented with four bits from 0000 through 1111. Common overhead 530 can also include a sequence field for diagnostics, which could include an unsigned integer value that can be incremented every time a super packet is formed in a super packet sub factory destined for a particular egress edge unit. The destination egress edge unit should generally see the sequence number increasing in packets sent from each ingress edge unit. The sequence number field can wrap around from a maximum value, in this example 65,535, and begin again at zero.

The classification index common overhead 530 could also include a status bit to indicate the presence or absence of some option determined by the router administrator or other party or to indicate that there is an alternative processing mechanism for processing the super packet. If there is a reserved flag in this field, it could be an indication that the bits associated with the field are reserved for future use. Or, an empty flag in this field could indicate that there are no packets in the super packet 500 that need to be serviced. Additionally, as indicated by Table 1, super packet common overhead 530 can include a number of port bundles indicating the number of port bundles included in super packet 500. The number of port bundles can be used by the destination egress edge unit 220 to properly disassemble super packet 500. However, in some cases there may be no port bundles in super packet 500, as might occur if the super packet did not contain any data packets, if the super packet contained only one data packet, or the data packets in the super packet were not further categorized into port bundles.

In addition common overhead 530, classification index 510 can include a port bundle entry 540 for each port bundle in super packet 500. Port bundle entries 540 can contain classification parameters that are common to each data packet within a port bundle. Table 2 provides exemplary field names, number of bits and comments for each field in one embodiment of port bundle entry 540.

TABLE 2

Example Port Bundle Classification Parameters

| Field Name | Number of Bits | Comments |
| --- | --- | --- |
| Offset to Port Bundle | 24 | Depends on Super Packet size |
| Index Type | 4 | Types are described in Table 2 |
| Version | 4 | Initial: 0000 |
| Status Bits | 4 | Reserved/Tail Frag/Head Frag |
| Number of PPEs | 12 | Depends on Super Packet size |

As can be understood from Table 2, port bundle entry 540 can include an indication of the offset to port bundle which provides the starting addresses of the port bundle overhead data, if any, the per-packet entries; e.g., the classification index entries for each individual packet, and the packet data. In port bundle entry 540, the index type can define the per-port bundle overhead information and the format of the per packet entries. The index types are described in more detail in conjunction with Tables 5-13. The version field of port bundle entry 540 can allow for evolution of the table of contents to support different configurations and modifications to the fields. Based on the combination of the index type and version, router 200 can select the appropriate algorithm to process port bundle entry 540 and per packet entries 550. As with common overhead 530, the status bits field of port bundle entry 540 can be used as an indicator of the presence or absence of an option or an indication to use an alternative processing mechanism. If this field indicates that it is reserved, the bits can be reserved for future use. The status field can also include a head or tail flag indicate the presence of a fragmented data packet in a port bundle.

While port bundles have, to this point, been described in terms of containing whole data packets, each port bundle may contain portions of a data packet that has been fragmented. A head fragment of a data packet can be created by super packet processor 270 when a super packet can not contain any additional complete data packets, but space remains free within the super packet. The packet can be split such that the remaining space in the super packet is occupied by the head fragment of a data packet. The super packet sub factory handling the super packet can duplicate the per packet information for the data packet being split and place the tail fragment and duplicated classification information in a buffer. The values for packet length can be adjusted for both the head and tail fragments of the data packet. The super packet subfactory can then check the head fragment bit in port bundle entry 540 for a port bundle that can accommodate the head fragment and place the head fragment at the end of the port bundle. In a later port bundle, the subfactory can check the tail fragment bit in the port bundle entry 540 for the later port bundle and place the tail fragment at the beginning of the later port bundle. Because packets can be fragmented to fill up super packets, the present invention can ensure super packets are filled to capacity before transporting the super packets to their destinations.

In addition to the fields already discussed, port bundle entry 540, as indicated by Table 2 can include a number of per-packet entries field to indicate how many per-packet entries are present for a particular port bundle. This value can be used by egress edge unit 220 to determine how many per packet entries must be processed for a port bundle. Thus, in one embodiment of the present invention port bundle entry 540 can include an offset to port bundle field, and index type, a version type, a status bit (e.g., reserved, head frag or tail frag) and an indication of the number of per packet entries.

While each of the fields illustrated in Table 2 has been discussed in detail, Table 3 is provided to further explicate the index type field. As illustrated in Table 3, the various index types can be assigned a numeric code (e.g., 0000 for "Best Effort") that can appear in port bundle entry 540 of the classification index 510. Table 3 includes an exemplary list of index types and the numerical codes that can be used to represent the index types.

TABLE 3

Yotta Packet Classification Index Type

| Index Type | Codepoint |
|---|---|
| Best Effort | 0000 |
| Quality of Service Queue | 0001 |
| Quality of Service Queue with per packet QoS Codepoint | 0010 |
| Quality of Service Queue with per packet QoS Weighting | 0011 |
| Common QoS Queue Parameter | 0100 |
| Common QoS Queue and QoS Weighting Parameters | 0101 |
| Common Packet Size and QoS Queue Parameters | 0110 |
| Common Packet Size, QoS Queue and QoS Weighting Parameters | 0111 |
| Reserved | 1000 ⇔ 1111 |

As previously noted, the format of the per packet entry is dependant on the index type. Thus, for example, a per packet entry for a best efforts index can have a different format than a per packet entry for a quality of service queue index.

Turning now to each of the index types, best efforts index can be used when no quality of service processing is desired and can include the egress port for a particular packet. The per-packet entry for a best effort index can include the length of the packet and a multi-cast bit. Generally, if the multi-cast bit is set, there will be multiple per-packet entries for a particular data packet. Thus, there will be fewer packets in super packet 500 than there are per-packet entries in the packet classification index 510. If the multi-cast bit is set when a particular packet is processed at egress edge unit 220, egress edge unit 520 will direct the packet to the first port indicated in the first per-packet entry for that packet and then to the port indicated in the second per-packet entry for that packet and so on until all the per packet entries for the data packet are exhausted. This allows a particular data packet to be sent to multiple ports as addressed by the per-packet entries. To terminate multicasting, the multicast bits can be left unset on the last per-packet entry for a particular packet so that egress edge unit 220 can move on to the next packet. Note, however, that if a multi-cast packet is only destined for a single port, it will be processed as normal. Table 4 summarizes exemplary information that can be included in a per-packet entry for a best efforts index.

TABLE 4

Example Best Effort Index Per Packet Entry

| Field Name | Number of Bits | Comments |
|---|---|---|
| Multicast | 1 | Part of Multicast collection if set |
| Length | 16 | Packet size in bytes |
| Port | 4 | 16 ports, 0000 ⇔ 1111 |

In addition to a best efforts index, there can also be a quality of service queue index. The per-packet entry for a quality of service queue index can include a multi-cast flag as previously described, the packet's length, the destination port number and the quality of service queue for the data packet to which the per packet entry pertains. Operators of router 200 can configure router 200 to have a large number of quality of service queues to be used in conjunction with a scheduler algorithm to implement packet routing priorities. Table 5 summarizes the information that could be included in one embodiment of a per-packet entry for a quality of service queue index.

TABLE 5

Example Quality of Service Queue Index Per Packet Entry

| Field Name | Number of Bits | Comments |
|---|---|---|
| Multicast | 1 | Part of Multicast collection if set |
| Length | 16 | Packet size in bytes |
| Port | 4 | 16 ports, 0000 ⇔ 1111 |
| Queues | 4 | 16 queues, 0000 ⇔ 1111 |

Again, the per-packet entry could include a multicast bit, the length of the packet, a destination port, as indicated by 0000 through 1111, and a queue, which in the case of 16 queues could be indicated by 0001 through 1111.

In addition to the information provided in a per-packet entry for a quality of service queue index, the per-packet entry for a quality of service queue with code point index could include a quality of service code point. The code point could be defined by the administrator of router 200 and could be used by egress edge unit 220 to select various processing operations. For example, a code point could indicate a drop probability category or a QoS processing option. Table 6 summarizes the information that could be included in one embodiment of a quality of service queue with code point index per-packet entry.

TABLE 6

Example Quality of Service Queue with Codepoint Index Per Packet Entry

| Field Name | Number of Bits | Comments |
|---|---|---|
| Multicast | 1 | Part of Multicast collection if set |
| Length | 16 | Packet size in bytes |
| Port | 4 | 16 ports, 0000 ⇔ 1111 |
| Queues | 4 | 16 queues, 0000 ⇔ 1111 |
| Codepoint | 4 | 16 codepoints, 0000 ⇔ 1111 |

A quality of service queue with waiting index per packet entry could include a quality of service weighting factor. A weighting factor can be defined by the administrator of router 200 and can be consistent with the port configuration of egress edge unit 220. For example, the super packet processor 270 could implement token bucket weighting, or other weighting schemes as would be understood by those of ordinary skill in the art, on packets received at ingress edge unit 210. Table 7 indicates the entries that could be used in one embodiment of a per-packet entry for quality of service queue with weighting index.

TABLE 7

Example Quality of Service Queue with Weighting Index Per Packet Entry

| Field Name | Number of Bits | Comments |
|---|---|---|
| Multicast | 1 | Part of Multicast collection if set |
| Length | 16 | Packet size in bytes |
| Port | 4 | 16 ports, 0000 ⇔ 1111 |
| Queues | 4 | 16 queues, 0000 ⇔ 1111 |
| Weighting Factor | 8 | QoS Parameter |

Additionally, the index can include a common quality of service queue. This index type can include an addition to port bundle overhead entry 540 in addition to a per-packet entry data. Port bundle overhead entry 540 can include a queue field for a common quality of service queue index, which can be located at the port bundle offset address, and can indicate a egress edge unit queue number, while the per-packet entry can contain a multi-cast flag, the packet length and the destination port number. Because the quality of service is set in the port bundle information, all the packets for the port bundle will receive a common quality of service. Tables 8 and 9 summarize the information for the common quality of service queue index for the port bundle overhead queue field and the per-packet entry fields.

TABLE 8

Example Port Bundle Entry for Common Quality of Service Queue Index Type

| Field Name | Number of Bits | Comments |
| --- | --- | --- |
| Queue | 8 | 256 queues, 00000000 ⇔ 11111111 |

TABLE 9

Example Common Quality of Service Queue Index Per Packet Entry

| Field Name | Number of Bits | Comments |
| --- | --- | --- |
| Multicast | 1 | Part of Multicast collection if set |
| Length | 16 | Packet size in bytes |
| Port | 4 | 16 ports, 0000 ⇔ 1111 |

Along with providing common quality of service queue indexing, the present invention can provide common quality of service queue and weighting indexing. This index type, again, includes an addition to the port bundle overhead entry 540, which can again be located in the port bundle offset address, in addition to the per-packet entry. Port bundle overhead queue and weighting factor fields can be used to identify a queue and quality of service weighting parameter that are shared by all per-packet entries for a port bundle. Tables 10 and 11 summarize the information that can be included in the port bundle overhead and the per-packet entries.

TABLE 10

Example Port Bundle Overhead Entry for the Common QoS Queue and Weighting Index Type

| Field Name | Number of Bits | Comments |
| --- | --- | --- |
| Queue | 8 | 256 queues, 00000000 ⇔ 11111111 |
| Weighting Factor | 8 | QoS Parameter |

TABLE 11

Example Common Quality of Service Queue and Weighting Index Per Packet Entry

| Field Name | Number of Bits | Comments |
| --- | --- | --- |
| Multicast | 1 | Part of Multicast collection if set |
| Length | 16 | Packet size in bytes |
| Port | 4 | 16 ports, 0000 ⇔ 1111 |

In another embodiment of the present invention, the index types can include a common packet size and quality of service queue. This index type can include a port bundle overhead area in addition to the per packet entry. Again, the port bundle overhead data can be located at the port bundle offset address, with the per packet entries immediately following the port bundle overhead data, as illustrated in FIG. 5A. The port bundle overhead packet size and queue fields can be used to identify a fixed packet size and quality of service queues used for all per packet entries for a port bundle. Per packet entry can contain a multicast flat and a destination port number. Tables 12 and 13 summarize data that can be included in the port bundle overhead and the per packet entries for a common packet size and quality of service queue index.

TABLE 12

Example Port Bundle Overhead Entry for the Common Packet Size and QoS Queue Index Type

| Field Name | Number of Bits | Comments |
| --- | --- | --- |
| Packet Size | 16 | Packet Size in bytes |
| Queue | 8 | 256 queues, 00000000 ⇔ 11111111 |

TABLE 13

Example Common Packet Size and Quality of Service Index Per Packet Entry

| Field Name | Number of Bits | Comments |
| --- | --- | --- |
| Multicast | 1 | Part of Multicast collection if set |
| Port | 4 | 16 ports, 0000 ⇔ 1111 |

Because the amount of information included with indexing in per packet entries can offset byte alignment for packets, the super packet 500's packet classification index 220 can include an index padding field in order to maintain byte alignment and packet data. Table 14 provides a summary of the information that can be included in an index padding field.

TABLE 14

Example of Per Packet Entry Index Padding

| Field Name | Number of Bits | Comments |
| --- | --- | --- |
| Padding | 1 ⇔ 7 | As required |

To summarize, router 200 can receive individual data packets at ingress edge unit 210 via port 215 and forward the packets to classification index module 260 where classification information (e.g., the destination egress edge unit, destination egress port and quality of service parameters) for an individual data packet can be extracted from the packet's header. The classification information for the individual data packet can be subsequently used in a per packet entry for the data packet in the classification index for the super packet in which the individual data packet is bundled. In one embodiment of router 200, data packets destined for the same egress edge unit 220 that arrived at the same ingress interface port 215 can be aggregated into port bundles at super packet processor 270. Classification information common to each of the data packets within a port bundle can be placed in the port bundle entry 530 of the classification index 510. It should be understood, however, that in other embodiments of router 200, data packets may not be organized into port bundles or may be bundled according to some other criteria such as quality of service parameters or destination egress port, and the format of the classification index 510 can be configured to accommodate various bundling schemes. At a super packet sub factory (e.g., super packet sub factory 392) port bundles can be aggregated together to form a super packet and classification information common to each of the port bundles in a super packet can be included in super packet overhead 520 of classification index 510. Once a super packet 500 has been constructed, the super packet 500 can forwarded to optical switch core 230 and then to the destination egress edge unit 220.

With reference to FIG. 2, at egress edge unit 220, the incoming super packet 500 can be forwarded to classification index processing module 265 to perform classification index processing (rather than packet classification). Because classification index 510 of super packet 500 contains classification information for the super packet 500, port bundles in super packet 500, and the constituent data packets in super packet 500 that was previously defined at the source ingress edge router 210, classification index processing module 265 need only perform simple table reading of classification index 510 rather than performing reclassification. Classification index processing module 265 can parse common overhead 520 to determine classification parameters that are common to all of the port bundles in super packet 500. As discussed in conjunction with Table 1, this information can include the source edge unit, destination edge unit, sequence number, status bits and number of port bundles, if any.

Classification index processing module 265 can also parse the port bundle to determine the starting address of each port bundle, the overhead information for the port bundle (e.g., the index type, version and status bits) and the number of per packet entries, if any, for the port bundle. Egress super packet factory 280 can extract the data packets from the port bundles and classification index processing module 265 can read the per packet entries to determine the destination port 225, quality of service parameters or other routing information for each data packet. The data packets then be forwarded to appropriate port 225. Additionally, if there are several QoS queues for a particular port, the data packet can be routed to the proper QoS queue. It should also be recalled that if a data packet is to multicast to server egress ports 225 there can be multiple per packet entries for the data packet. Furthermore, the format of the per packet entries for data packets in a particular port bundle can be determined by the index type in the port bundle entry 540 for that port bundle. Based on the classification information in the per packet entries, the individual data packets of super packet 500 can be routed to the appropriate port.

In one embodiment of the present invention, index classification processing module 265 can be distributed over several components of egress edge router 220. For example classification index module 260 could determine the destination port for each data packet at egress super packet factory 280 and determine the appropriate QoS queue for each data packet at the destination port. Thus, in this embodiment, the processing of super packet classification index 510 could occur in two stages (e.g., the destination port for a data packet would be determined at egress super packet factory 280, while the QoS queue for the data packet would be determined at the destination port).

Figure 5D:
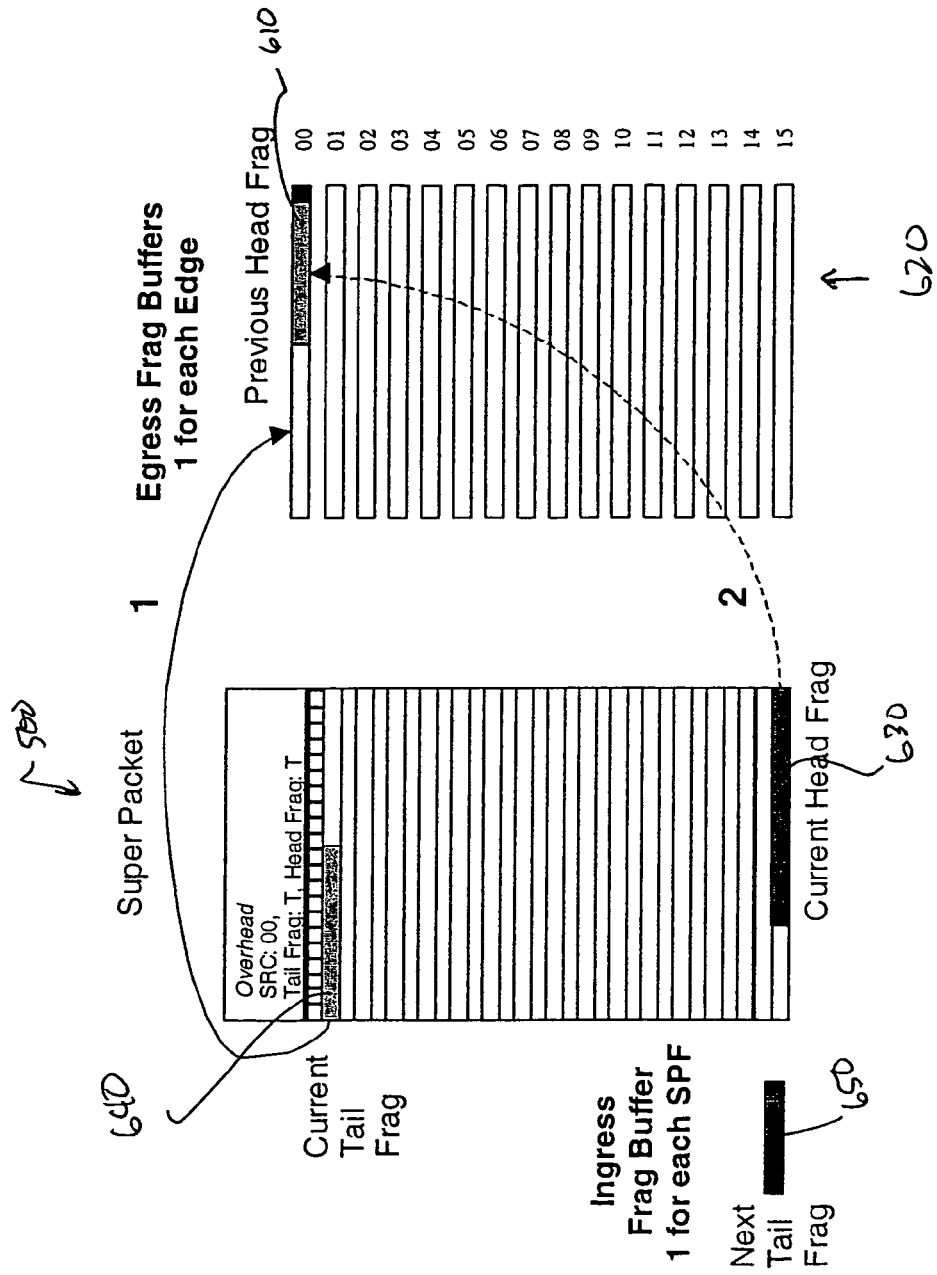
FIG. 5D illustrates one embodiment of combining fragments of packets from arriving super packets.

As noted above, data packets can generally be routed to the appropriate egress port 225 based on the classification information contained in the per packet entries. However, if a head frag flag is set in the status bit of a port bundle entry 530, the last packet in a port bundle can be placed in a fragmentation buffer for the destination port of the fragmented package. When a port bundle arrives, typically in the same super packet 500, with the tail frag flag set in the status bit of the corresponding port bundle entry 530, the tail fragment can be forwarded to the fragmentation buffer to be joined with the head fragment. The combined data packet can then be forwarded to the port with which the fragmentation queue is associated. FIG. 5D shows diagrammatically how this head frag/tail frag process can be implemented. Initially, previous head frag (or fragment) 610 is stored in frag buffer 620. As super packet 500 arrives, it can contain a current head frag 630 and a current tail frag 640. If super packet 500 contains a current tail frag 640, then previous head frag 610 will always exist in frag bugger 620 (because it came with the previous super packet). The current tail frag 640 is joined with previous head frag 610 (as indicated by arrow 1) to create a packet. After this newly created packet is moved out of frag buffer 620, current head frag 630 is moved into frag buffer 620 (at position 00) and the next arriving super packet 500 will provide its tail fragment (shown as next tail frag 650).

The present invention provides a system and method for classifying data packets at an ingress edge unit of a router/switch without requiring reclassification of the data packets at the destination egress edge unit. In contrast to prior art systems in which classification information is typically lost after a data packet or super packet leaves an ingress edge unit, the present invention can place classification information for a data packet or super packet in a classification index for the data packet or super packet. The classification index can then be communicated to the destination egress edge unit along with the data packet or super packet. Because the destination egress edge unit receives classification information (e.g., in the classification index) from the ingress edge unit, the egress edge unit need simply read the classification information to determine the destination port, quality of service queue, etc., rather than reclassifying the data packet. Furthermore, the classification index containing the classification information can be formatted as an easily readable table so that the destination edge router need only employ simple table reading hardware and/or software to determine the destination port, quality of service queue, etc. for a data packet. Thus, the present invention can reduce the software/hardware requirements for the destination edge router and minimize duplicative processing of a data packet.

Although the present invention has been described in detail herein with reference to the illustrative embodiments, it should be understood that the description is by way of example only and is not to be construed in a limiting sense. It is to be further understood, therefore, that the numerous changes in the details of the embodiments of this invention and additional embodiments of this invention will be apparent to and may be made by persons of ordinary skill in the art having reference to this description. It is contemplated that all such changes in additional embodiments are within the spirit and true scope of this invention as claimed below.

What is claimed is:

1. A method of routing a plurality of data packets through a network, comprising:
   at an ingress edge unit: determining a set of classification parameters for each of the plurality of data packets arriving at the ingress edge unit, wherein the set of classification parameters includes destination information and one or more quality of service (QoS) parameters for the respective data packet and wherein the destination information includes a destination egress edge unit; and constructing a classification index including the QoS parameters and information about a plurality of queues associated with the QoS parameters;
   transporting the plurality of data packets and the classification index to the destination egress edge unit; and at the destination egress edge unit, routing each of the plurality of data packets to an associated destination egress port within the destination egress edge unit based on the classification parameters determined at the ingress edge unit and without reclassifying any data packet at the destination egress edge unit.

2. The method of claim 1, wherein constructing the classification index, comprises incorporating the set of classification parameters for each of the plurality of data packets in the classification index.

3. The method of claim 1, wherein the determining a set of classification parameters for each of the plurality of data packets further comprises:
for each of the plurality of data packets, determining the destination egress edge unit out of a plurality of egress edge units and determining the associated destination egress port out of a plurality of egress ports within the determined destination egress edge unit.

4. The method of claim 3, further comprising accessing a look-up table to correlate a destination IP address to the determined destination egress edge unit and the destination egress port for each of the plurality of data packets.

5. The method of claim 1, wherein the plurality of data packets is subdivided into at least one port bundle, and further comprising:
determining a first set of common classification parameters, wherein the first set of common classification parameters are common to each data packet in a port bundle.

6. The method of claim 5, further comprising:
determining a second set of common classification parameters, wherein the second set of common classification parameters are common to each port bundle; and
transporting the first set and the second set of common classification parameters to the destination egress edge unit.

7. A method for data packet processing in a telecommunications system, comprising:
at an ingress edge unit of a router, determining a set of classification parameters for a data packet arriving at the ingress edge unit, wherein the classification parameters include destination information and one or more quality of service (QoS) parameters for the data packet, and wherein the destination information includes a destination egress port of the router;
constructing a classification index including the set of classification parameters for a plurality of data packets, and also including information about a plurality of queues associated with the QoS parameters;
forwarding the classification index to at least one destination edge unit of the router, including a destination edge unit associated with the destination egress port associated with the data packet; and
forwarding the data packet to the destination egress port according to the classification parameters determined at the ingress edge unit and without requiring reclassification of the data packet.

8. The method of claim 7, further comprising configuring an optical core of the router to route the data packet from the ingress edge unit to the destination egress port.

9. The method of claim 8, further comprising:
determining a destination egress edge unit associated with the destination egress port for the data packet; and
transporting the data packet to the determined destination egress edge unit.

10. The method of claim 9, further comprising accessing a look-up table to correlate a destination IP address to the determined destination egress edge unit and the destination egress port.

11. The method of claim 7, further comprising:
constructing the classification index to include the destination egress edge unit and the destination egress port.

12. A system for the classification of data packets in a telecommunications system, comprising:
at least one ingress edge unit coupled to an optical switch core, wherein the at least one ingress edge unit is configured to
receive a data packet;
determine classification parameters for the data packet, including one or more quality of service (QoS) parameters;
communicate the data packet and the classification parameters associated with the data packet to the optical switch core, wherein the at least one ingress edge unit is configured to communicate the classification parameters as part of a classification index including the classification parameters for a plurality of data packets and information about each of a plurality of queues associated with the QoS parameters; and
at least one egress edge unit coupled to the optical switch core, wherein the at least one egress edge unit is configured to
receive the data packet;
process the classification parameters associated with the data packet; and
route the data packet to a destination egress port within the at least one egress edge unit according the classification parameters determined at the at least one ingress edge unit and without requiring reclassification of the data packet.

13. The system of claim 12, further comprising:
at least one ingress packet link connecting the at least one ingress edge unit and the optical switch core; and
at least one egress packet link connecting the optical switch core and the at least one egress edge unit,
wherein the classification parameters are communicated to the at least one egress edge unit via the at least one ingress packet link and the at least one egress packet link.

14. The system of claim 12, further comprising:
at least one ingress control link connecting the at least one ingress edge unit and the optical switch core; and
at least one egress control link connecting the optical switch core and the at least one egress edge unit,
wherein the classification parameters are communicated to the at least one egress edge unit via the at least one ingress control link and the at least one egress control link.

15. A method of routing a plurality of data packets through a network, comprising:
at an ingress edge unit, determining a set of classification parameters for each of the plurality of data packets arriving at the ingress edge unit, wherein the set of classification parameters includes destination information and wherein the destination information includes a destination egress edge unit, wherein determining a set of classification parameters for each of the plurality of data packets further comprises, for each of the plurality of data packets, determining a destination egress edge unit out of a plurality of egress edge units and determining a destination egress port out of a plurality of egress ports within the determined destination egress edge unit, and wherein determining a set of classification parameters for each of the plurality of data packets further includes determining a set of quality of service (QoS) parameters associated with each of the plurality of data packets;

constructing a classification index including the QoS parameters for each of the plurality of data packets, wherein the constructing comprises including, in the classification index, information about each of a plurality of queues associated with the QoS parameters;

transporting the plurality of data packets to the destination egress edge unit;

at the destination egress edge unit, routing each of the plurality of data packets to the associated destination egress port within the destination egress edge unit based on the classification parameters determined at the ingress edge unit and without reclassifying any data packet at the destination egress edge unit; and forwarding the classification index to the destination egress edge unit.

16. A method of routing a plurality of data packets through a network, comprising:

at an ingress edge unit, determining a set of classification parameters for each of the plurality of data packets arriving at the ingress edge unit, wherein the set of classification parameters includes destination information and wherein the destination information includes a destination egress edge unit, wherein determining a set of classification parameters for each of the plurality of data packets further comprises, for each of the plurality of data packets, determining a destination egress edge unit out of a plurality of egress edge units and determining a destination egress port out of a plurality of egress ports within the determined destination egress edge unit, and wherein determining a set of classification parameters for each of the plurality of data packets further includes determining a set of quality of service (QoS) parameters associated with each of the plurality of data packets;

constructing a classification index including the QoS parameters for each of the plurality of data packets, wherein the constructing comprises constructing a QoS vector, the QoS vector being code points of compressed QoS parameters, and placing the QoS vector in the classification index;

transporting the plurality of data packets to the destination egress edge unit;

at the destination egress edge unit, routing each of the plurality of data packets to the associated destination egress port within the destination egress edge unit based on the classification parameters determined at the ingress edge unit and without reclassifying any data packet at the destination egress edge unit; and forwarding the classification index to the destination egress edge unit.

17. A method of routing a plurality of data packets through a network, comprising:

at an ingress edge unit, determining a set of classification parameters for each of the plurality of data rackets arriving at the ingress edge unit wherein the set of classification parameters includes destination information and wherein the destination information includes a destination egress edge unit; and further comprising at the ingress edge unit:

creating a port bundle comprising data packets including a first set of common classification parameters;

extracting common information from the data packets in the port bundle;

storing the common information and classification information for each of the plurality of data packets in an overhead for the port bundle; and assembling a plurality of port bundles including a second set of common classification parameters into a super packet;

transporting the plurality of data packets to the destination egress edge unit; and at the destination egress edge unit, routing each of the plurality of data packets to an associated destination egress port within the destination egress edge unit based on the classification parameters determined at the ingress edge unit and without reclassifying any data packet at the destination egress edge unit.

18. The method of claim 17, further comprising at the ingress edge unit:

extracting common information from the plurality of port bundles; and storing the common information and classification information for each of the plurality of port bundles in an overhead for the super packet.

19. The method of claim 18, further comprising at the ingress edge unit:

constructing a classification index for the super packet, the classification index including classification parameters for each of the plurality of data packets in the super packet; and storing the classification index in an overhead of the super packet.

20. The method of claim 17, wherein a fragment of a fragmented data packet is stored one of the plurality of port bundles in the super packet to fill a remaining space of the super packet and an associated flag is set to indicate which portion of the fragmented data packet is stored in the super packet.

21. The method of claim 19, wherein the classification index comprises an entry for each of the plurality of data packets in the super packet.

* * * * *

UNITED STATES PATENT AND TRADEMARK OFFICE
CERTIFICATE OF CORRECTION

| | | |
|---|---|---|
| PATENT NO. | : 8,116,315 B2 | Page 1 of 1 |
| APPLICATION NO. | : 11/471149 | |
| DATED | : February 14, 2012 | |
| INVENTOR(S) | : Posey, Jr. | |

It is certified that error appears in the above-identified patent and that said Letters Patent is hereby corrected as shown below:

Title page, item (57), under "Abstract", in Column 2, Line 8, delete "according the" and insert -- according to the --.

Title Page 2, item (56), under "Other Publications", in Column 2, Line 1, delete "Integratio"," and insert -- integration", --.

Title Page 2, item (56), under "Other Publications", in Column 2, Line 11, delete "1194-Jun." and insert -- 1994-Jun. --.

Title Page 2, item (56), under "Other Publications", in Column 2, Line 22, delete "Tuneable" and insert -- Tunable --.

Column 1, line 8, delete "10,138,760," and insert -- 10/138,760, --.

Column 19, line 2, in Claim 2, delete "index, comprises" and insert -- index comprises --.

Column 20, line 9, in Claim 12, delete "parameters;" and insert -- parameters; and --.

Column 20, line 26, in Claim 12, delete "according the" and insert -- according to the --.

Column 22, line 4, in Claim 17, delete "data rackets" and insert -- data packets --.

Column 22, line 5, in Claim 17, delete "unit wherein" and insert -- unit, wherein --.

Signed and Sealed this
Twenty-eighth Day of August, 2012

David J. Kappos
*Director of the United States Patent and Trademark Office*